United States Patent
Takayama

(10) Patent No.: US 9,526,985 B2
(45) Date of Patent: Dec. 27, 2016

(54) METHOD FOR FORMING GAME CONTENT GROUP, COMPUTER-READABLE, NON-TRANSITORY MEDIUM, AND COMPUTER

(71) Applicant: GREE, INC., Minato-ku, Tokyo (JP)

(72) Inventor: Daisuke Takayama, Minato-ku (JP)

(73) Assignee: GREE, INC., Minato-ku (JP)

(*) Notice: Subject to any disclaimer, the term of this patent is extended or adjusted under 35 U.S.C. 154(b) by 258 days.

(21) Appl. No.: 14/316,213

(22) Filed: Jun. 26, 2014

(65) Prior Publication Data
US 2015/0005050 A1    Jan. 1, 2015

(30) Foreign Application Priority Data

Jun. 27, 2013  (JP) ................. 2013-135427

(51) Int. Cl.
| | |
|---|---|
| G06F 17/00 | (2006.01) |
| A63F 13/30 | (2014.01) |
| A63F 13/49 | (2014.01) |
| A63F 13/60 | (2014.01) |
| A63F 13/332 | (2014.01) |
| A63F 13/335 | (2014.01) |

(52) U.S. Cl.
CPC ............ *A63F 13/30* (2014.09); *A63F 13/332* (2014.09); *A63F 13/335* (2014.09); *A63F 13/49* (2014.09); *A63F 13/60* (2014.09); *A63F 2300/554* (2013.01)

(58) Field of Classification Search
USPC ..................................... 463/16–25
See application file for complete search history.

(56) References Cited

U.S. PATENT DOCUMENTS

| | | | |
|---|---|---|---|
| 2001/0041053 A1* | 11/2001 | Abecassis ............... | A63F 13/10 386/291 |
| 2013/0130791 A1 | 5/2013 | Myogan | |
| 2014/0128164 A1* | 5/2014 | Ukai ....................... | A63F 13/12 463/42 |
| 2014/0315638 A1* | 10/2014 | Ikeda ..................... | A63F 13/12 463/31 |

(Continued)

FOREIGN PATENT DOCUMENTS

| | | |
|---|---|---|
| JP | 2009-233237 | 10/2009 |
| JP | 2012-183293 | 9/2012 |
| JP | 2013-034828 | 2/2013 |

OTHER PUBLICATIONS

Japanese Office action for related Japanese Application No. JP 2014-146023, mailed Sep. 2, 2014, including English translation, 4pp.

(Continued)

*Primary Examiner* — Ronald Laneau
(74) *Attorney, Agent, or Firm* — Lewis Roca Rothgerber Christie LLP

(57) ABSTRACT

A method for forming a game content group performed by a computer which includes an operation module and a shake detector for detecting a shake, and which forms the game content group formed by a plurality of game contents to be used in a game, includes storing a first state of the game content group in a storage module, changing the game content group to a second state according to an operation by a user via the operation module, and restoring the game content group to the first state based on a detection result by the shake detector.

8 Claims, 14 Drawing Sheets

(56) References Cited

U.S. PATENT DOCUMENTS

2015/0163269 A1* 6/2015 Ryu .................. H04L 65/60
709/204

OTHER PUBLICATIONS

Japanese Office action for related Japanese Application No. JP 2014-259314, mailed Feb. 3, 2015, including English translation, 5pp.
Wonder Life Special, Sonic and the Secret Rings, Strongest Conquest Guide, p. 18, first edition, Apr. 25, 2007, Shogakukan Inc., Japan, published Apr. 25, 2007, including English brief explanation, 5pp.
Office action mailed Jul. 23, 2014 in corresponding Japanese Patent Application No. 2013-135427, including English translation, 7pp.
Mac Fan, Japan, Mainichi Communications, Inc., Nov. 1, 2011, vol. 19, No. 11, p. 142, including partial English translation, 4pp.
Sakatsuku DS Touch and Direct Perfect Guide, Japan, Enterbrain Brand Company, Jan. 8, 2009, First Edition, p. 16, including partial English translation, 4pp.
Office action mailed Apr. 28, 2015 for corresponding Japanese Application No. 2014-259314, including English translation, 6pp.
"Worlfard" manual—operating procedure: Deck edit, Oct. 22, 2012; http://www.kikoumori.com/worlfard/manual12.html, including partial English translation, 6pp.

* cited by examiner

| HISTORY ID | CHANGE HISTORY |
|---|---|
| 0001 | (POSITION1,CARD1), (POSITION2,CARD2), (POSITION3,CARD3), ... |
| 0002 | (POSITION1,CARD2), (POSITION2,CARD1), (POSITION3,CARD3), ... |
| ... | ... |

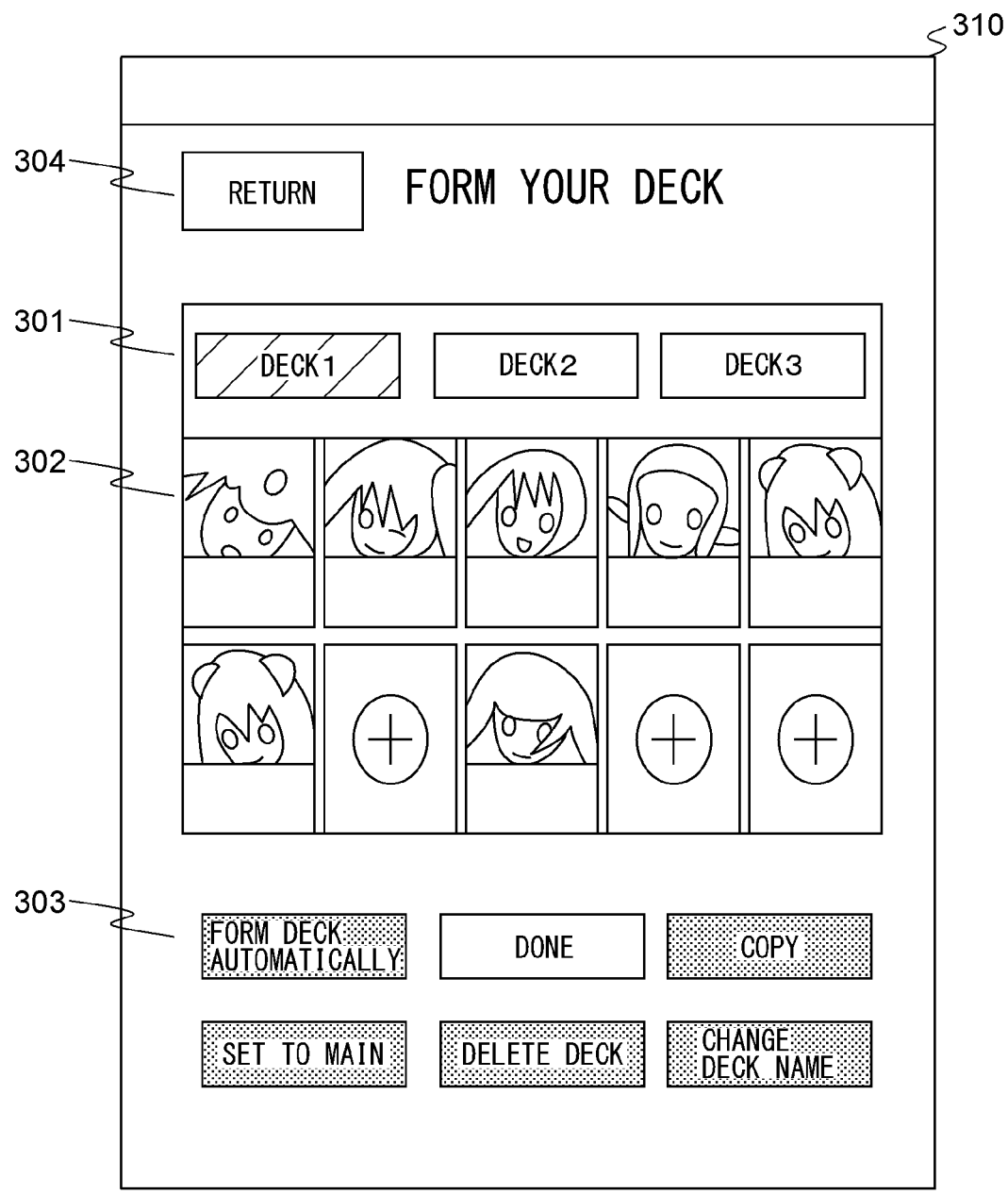

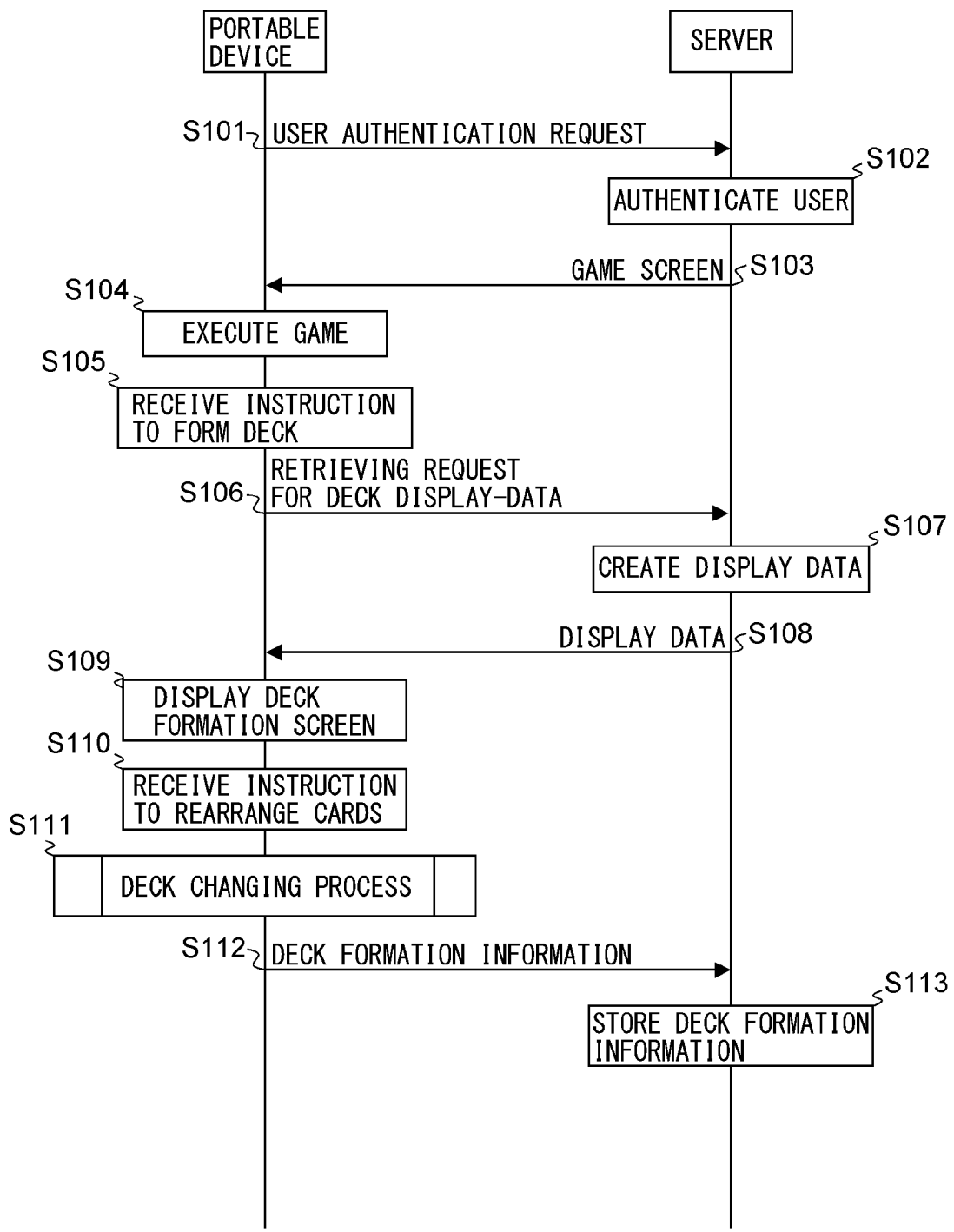

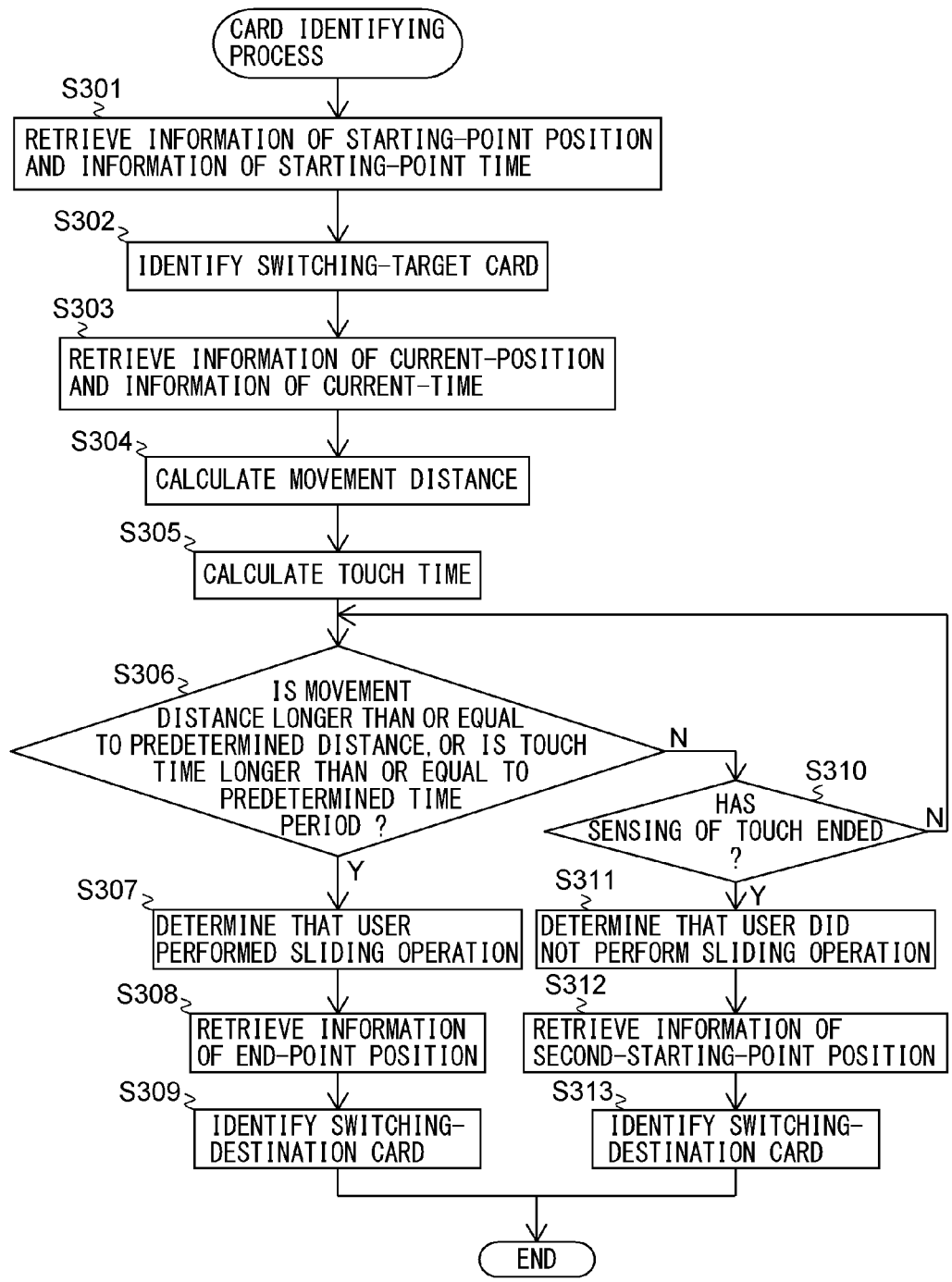

METHOD FOR FORMING GAME CONTENT GROUP, COMPUTER-READABLE, NON-TRANSITORY MEDIUM, AND COMPUTER

CROSS-REFERENCE TO RELATED APPLICATIONS

This application is based upon and claims the benefit of priority of prior Japanese Patent Application No. 2013-135427, filed on Jun. 27, 2013, the entire contents of which are incorporated herein by reference.

TECHNICAL FIELD

Embodiments discussed in the present specification relate to forming a game content group.

BACKGROUND

In recent years, servers that provide games to portable devices via a communication network have become widespread. An example of games provided by such servers includes a game played by using game content groups each formed by multiple game contents that are digital contents such as cards.

For example, Japanese Laid-open Patent Publication No. 2013-034828 discloses a game in which users use decks each corresponding to a card group formed by one or more cards registered in a game system in advance and each of the users takes cards from their decks to lay the cards down.

In the game system disclosed in Japanese Laid-open Patent Publication No. 2013-034828, a user device displays a display screen for creating and editing a deck, the display screen including a deck formation area and an owned-card area. A user can create a deck by selecting a card to add to the deck from the owned-card area, and then dragging and dropping the icon corresponding to the card to the deck formation area.

SUMMARY

In the game system disclosed in Japanese Laid-open Patent Publication No. 2013-034828, a user can create a deck including cards selected from the owned cards. However, to make a change in the created deck, for example, it is necessary to put the cards in the deck formation area back to the owned-card area once, and then move other cards in the owned-card area to the deck formation area. Such operation is troublesome, and the user may perform erroneous operation in some cases especially when operating a personal digital assistant having a small screen such as a so-called smartphone. When erroneous operation is performed, operation as described above needs to be repeated to return the state of the cards in the deck formation area to the state before the erroneous operation. This may degrade the user experience (UX: contents of experience, satisfaction level, and the like of the user) at the time when the device is operated by the user.

The present invention has been devised to overcome the above prior art problem, and an object of the invention is to provide a method of forming a game content group, a computer-readable, non-transitory medium, and a computer that can improve the UX at the time when a device is operated by a user executing a game in which game content groups are used.

Provided is a method for forming a game content group performed by a computer which includes an operation module and a shake detector for detecting a shake, and which forms the game content group formed by a plurality of game contents to be used in a game. The method includes storing a first state of the game content group in a storage module, changing the game content group to a second state according to an operation by a user via the operation module, and restoring the game content group to the first state based on a detection result by the shake detector.

Preferably, in the above method, an initial state of the game content group is stored as the first state in the storage module, and the game content group is restored to the initial state, when the shake detector detects a shake for a predetermined number of times or more in a predetermined time period.

Preferably, in the above method, an immediately previous state of the game content group is stored as the first state in the storage module, and the game content group is restored to the immediately previous state, when the shake detector detects a shake for once in a predetermined time period.

Preferably, in the above method, when the game content group is changed, a state of the game content group after the change is stored in the storage module.

Preferably, in the above method, the operation module is a touch screen, and when two game contents among the game contents constituting the game content group are tapped on the operation module, the positions of the two tapped game contents are switched.

Preferably, in the above method, the operation module is a touch screen, and when one game content among the game contents constituting the game content group is slid, on the operation module, to a position of a different one of the game contents constituting the game content group, a position of the one game content and the position of the different one are switched.

Provided is a computer-readable, non-transitory medium storing a computer program, wherein the computer program causes a computer which includes an operation module and a shake detector for detecting a shake, and which forms a game content group formed by a plurality of game contents to be used in a game, to execute a process. The process includes storing a first state of the game content group in a storage module, changing the game content group to a second state according to an operation by a user via the operation module, and restoring the game content group to the first state based on a detection result by the shake detector.

Provided is a computer for forming a game content group formed by a plurality of game contents to be used in a game. The computer includes an operation module, a shake detector for detecting a shake, a storage module for storing a first state of the game content group, a game-content-group changing module for changing the game content group to a second state according to an operation by a user via the operation module, and a game-content-group restoring module for restoring the game content group to the first state based on a detection result by the shake detector.

The above method of forming a game content group, the computer-readable, non-transitory medium, and the computer can improve the UX at the time when a device is operated by a user executing a game in which game content groups are used, by changing the state of a game content group according to an operation performed by a user and restoring the state of the game content group to a particular state when the portable device is shaken.

BRIEF DESCRIPTION OF THE DRAWINGS

Other features and advantages of the present invention will be apparent from the ensuing description, taken in conjunction with the accompanying drawings, in which:

FIG. 3B is a view illustrating an example of a deck formation screen;

FIG. 8 is a flowchart illustrating an example of an operation sequence of the game system 1;

FIG. 10 is a flowchart illustrating an example of an operation flow of a card determining process.

DESCRIPTION OF EMBODIMENTS

Hereinafter, with reference to the drawings, a method for forming a game content group, a computer-readable, non-transitory medium, and a computer will be described. It should be noted that the technical scope of the present invention is not limited to embodiments of the invention but covers the invention described in the claims and its equivalent.

(1) Overview of Embodiment

In this embodiment, users execute a game in which game content groups each formed by multiple game contents registered in a game system in advance are used. The game contents correspond to digital contents to be used in the game. In this embodiment, a description will be given of a game in which cards are used as game contents, and decks each corresponding to a card group formed by multiple cards are used as a game content group. Each portable device makes a change in a corresponding deck according to an operation by the user and stores the change in change history. When the portable device is shaken, each portable device restores the state of the deck to a particular state stored in the change history. With this embodiment, it is aimed to improve the UX at the time when the device is operated by the user executing the game in which decks are used. The expression "state of the deck" indicates the cards constituting the deck and the state of the arrangement of the cards. In addition, in this embodiment, description will be given to changing the arrangement of the cards constituting the deck, as an example of "making a change to the deck".

(2) Configuration of Game System 1

Figure 1:
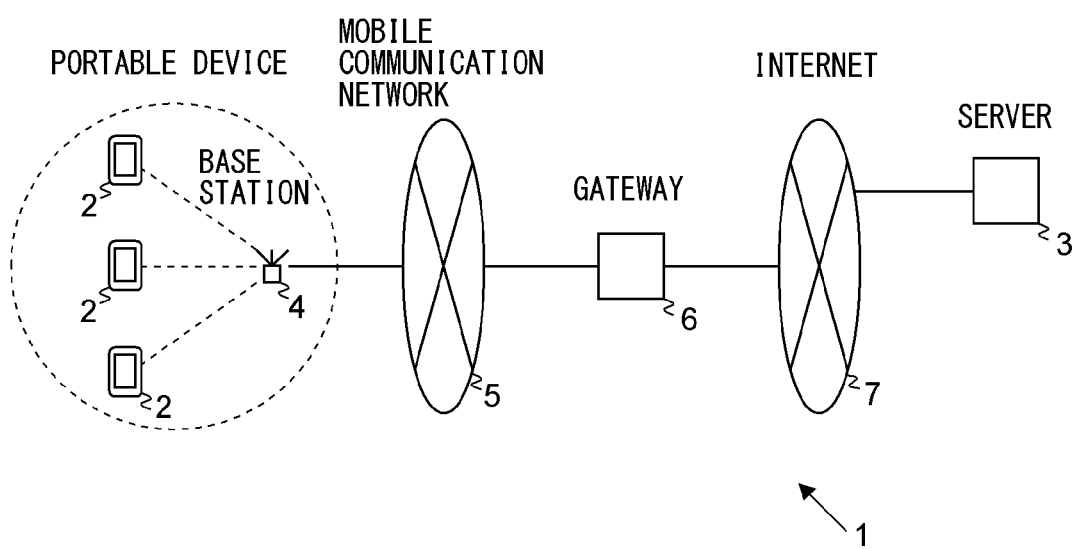
FIG. 1 is a diagram illustrating an example of a schematic configuration of a game system 1.

FIG. 1 is a diagram illustrating an example of the schematic configuration of a game system 1.

The game system 1 includes at least one portable device 2 and a server 3. The portable device 2 and the server 3 are connected to each other via a communication network, and are, for example, connected to each other via a base station 4, a mobile communication network 5, a gateway 6, and the Internet 7. Programs executed by the portable device 2 (e.g., a browsing program) and programs executed by the server 3 (e.g., a game program) communicate using a communication protocol such as the Hypertext Transfer Protocol (HTTP) or the like.

(2.1) Configuration of Portable Device 2

Figures 2A, 2B:
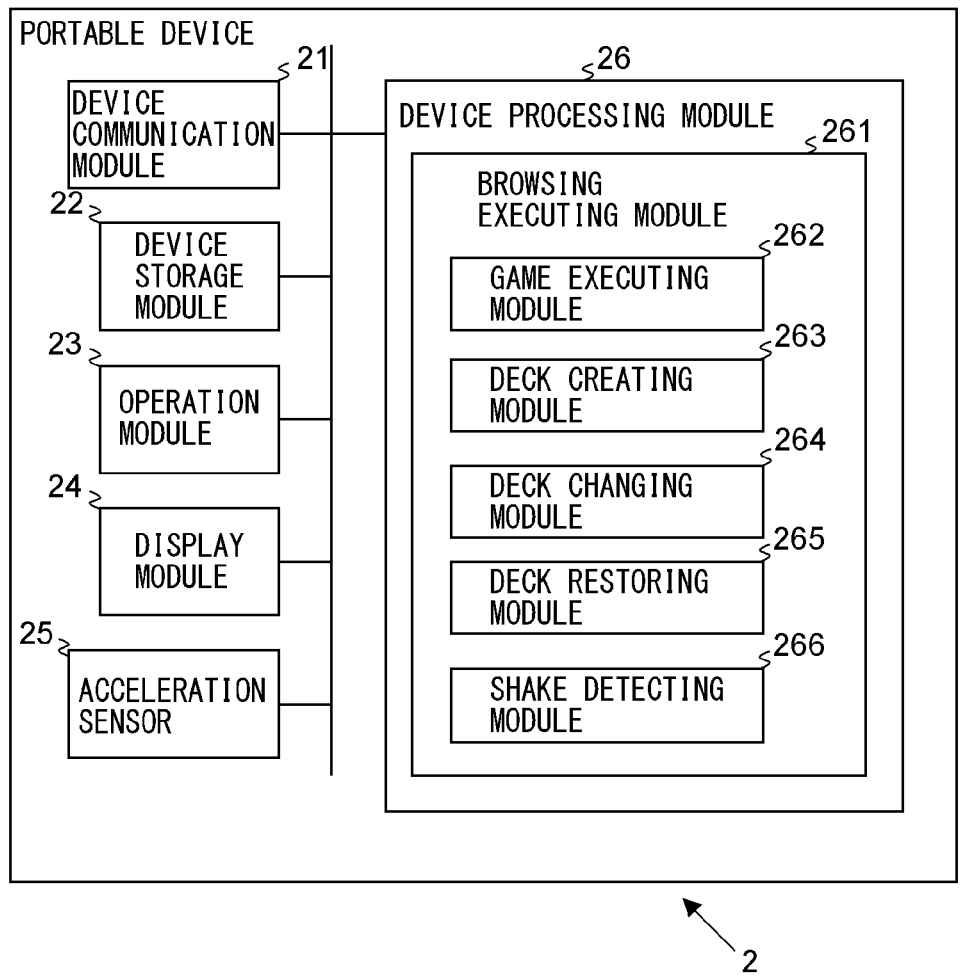
FIG. 2A is a diagram illustrating an example of a schematic configuration of a portable device 2.
FIG. 2B is a table illustrating an example of a data structure of a history management table.

FIG. 2A is a diagram illustrating an example of the schematic configuration of the portable device 2.

The portable device 2 is connected to the server 3 via the base station 4, the mobile communication network 5, the gateway 6, and the Internet 7, and thereby communicates with the server 3. The portable device 2 executes a game in which game content groups each formed by multiple game contents are used, and forms a game content group. As mentioned above, game contents correspond to digital contents to be used in the game, for example, cards, character figures, avatars, items, or the like. In this embodiment, the portable device 2 executes a game in which cards registered to the game system 1 in advance are used as game contents, and a deck corresponding to a card group formed by multiple cards is used as a game content group. The portable device 2 changes the state of the deck according to an operation by the user via an operation module 23, and stores the change in change history. Moreover, upon detection of a shake of the portable device 2, the portable device 2 restores the state of the deck to a particular state stored in the change history. To enable this, the portable device 2 includes a device communication module 21, a device storage module 22, the operation module 23, a display module 24, an acceleration sensor 25, and a device processing module 26.

Note that, although it is assumed that a multi-function mobile phone (a so-called "smartphone") is used as the portable device 2 in this embodiment, the present invention is not limited to this. The portable device 2 may be any device as long as the present invention is applicable, and may be a mobile phone (a so-called "feature phone"), a personal digital assistant (PDA), a portable game console, a portable music player, a tablet personal computer (PC), for example.

The device communication module 21 includes a communication interface circuit with an antenna having a predetermined frequency bandwidth as a reception bandwidth, and thereby connects the portable device 2 to a wireless communication network. The device communication module 21 establishes a wireless signal link based on code division multiple access (CDMA) system or the like, with the base station 4 via a channel assigned by the base station 4, and thereby communicates with the base station 4. Moreover, the device communication module 21 transmits data provided by the device processing module 26, to the server 3 or the like. Furthermore, the device communication module 21 provides data received from the server 3 or the like, to the device processing module 26.

The device storage module 22 includes at least one of a semiconductor memory, a magnetic disk device, and an optical disk device, for example. The device storage module 22 stores an operating system program, driver programs, application programs, data, and the like to be used in processes performed on the device processing module 26. For example, the device storage module 22 stores, as driver programs, an input-device driver program for controlling the operation module 23, an output-device driver program for controlling the display module 24, and the like. In addition, the device storage module 22 stores, as application programs, a browsing program for creating, changing, and restoring the constitution of cards on a deck according to instructions by the user, and the like. Furthermore, the device storage module 22 stores, as data, a history management table (FIG. 2B) for managing change history that stores past states of the deck, display data, video data, image data, and the like related to cards constituting the deck, and the like. As mentioned previously, the "state of the deck" indicates cards constituting the deck and the state of the arrangement of the cards. Additionally, the device storage module 22 may temporarily store temporary data related to predetermined processes. The computer program may be installed on the device storage module 22 from a computer-readable, non-transitory medium such as a compact disk read only memory (CD-ROM), a digital versatile disk read only memory (DVD-ROM), or the like by using a well-known setup program or the like.

FIG. 2B illustrates a history management table for managing change history that stores past states of the deck. The history management table stores, for each change history, the identification number of the change history (hereinafter referred to as a history ID), the change history itself, and the like. As the change history, the initial state of the deck is stored at the top, and is then followed by the state of the deck after each change at each time when the state of the deck is changed. Alternatively, as the change history, the initial state of the deck is stored at the top, and is then followed by the contents of the change from the immediately previous state.

The operation module 23 may be any device as long as being capable of operating the portable device 2, and may be a touchpad, or a keyboard, for example. The user can input such as characters and numbers using the operation module 23. When being operated by the user, the operation module 23 generates a signal corresponding to the operation. Then, the generated signal is provided to the device processing module 26, as an instruction from the user.

The display module 24 may be any device as long as being capable of displaying videos, images, and the like, and may be a liquid crystal display, or an organic electro-luminescence (EL) display, for example. The display module 24 displays, for example, a video corresponding to video data and an image corresponding to image data provided by the display processing module 26.

The acceleration sensor 25 is a sensor that detects the acceleration applied to the acceleration sensor 25 in each of the three axial directions. The acceleration sensor 25 may be, for example, a tri-axial piezoresistive acceleration sensor using the piezoresistance effect, or a tri-axial, electrostatic capacitance-type acceleration sensor using changes in electrostatic capacity, for example. In response to a request from the device processing module 26, the acceleration sensor 25 outputs, for every certain time period (e.g., 10 msec), acceleration information indicating the acceleration in each of the horizontal direction (X direction) and the vertical direction (Y direction) of the screen of the portable device 2, and the direction orthogonal to the screen (Z direction).

Alternatively, the portable device 2 may include, instead of the acceleration sensor 25, a gyro sensor that detects the turning angle velocity of the portable device 2, and outputs, for every certain time period, turning-angle-velocity information indicating the turning angle velocity, instead of acceleration information.

The device processing module 26 includes one or a plurality of processors and their peripheral circuitry. The device processing module 26 provides general control over operations of the entire portable device 2, and may be a central processing unit (CPU), for example. The device processing module 26 controls operations of the device communication module 21, the display module 24, and the like so that various processes by the portable device 2 would each be performed in an appropriate procedure according to the programs stored in the device storage module 22, operations performed on the operation module 23, acceleration information from the acceleration sensor 25, and the like. The device processing module 26 performs each process on the basis of the programs stored in the device storage module 22 (i.e., the operating system program, driver programs, application programs, and the like). The device processing module 26 can execute multiple programs (application programs and the like) in parallel.

(2.1.1) Configuration of Device Processing Module 26

The device processing module 26 includes at least a browsing executing module 261. The browsing executing module 261 includes a game executing module 262, a deck creating module 263, a deck changing module 264, a deck restoring module 265, and a shake detector 266. These modules are functional modules implemented by a program executed on the processor provided in a server processing module 33. Alternatively, each of these modules may be implemented as a firmware on the portable device 2.

In response to an instruction by the user via the operation module 23, the browsing executing module 261 transmits a retrieving request for display-data related to particular display data, to the server 3 via the device communication module 21. Moreover, the browsing executing module 261 receives corresponding display data from the server 3 via the device communication module 21. The browsing executing module 261 creates drawing data on the basis of the received display data. In other words, the browsing executing module 261 specifies control data and content data by analyzing the received display data, lays out the specified content data according to the specified control data, and thereby creates drawing data. Then, the browsing executing module 261 outputs the created drawing data to the display module 24. The display data can be created using a language such as HyperText Markup Language 5 (HTML5), Cascading Style Sheets 3 (CSS3), or JavaScript (registered trademark).

The game executing module 262 executes the game provided by the server 3, in response to an instruction by the user via the operation module 23. Upon receipt of an instruction to start the game from the user, the game executing module 262 further receives a user identification (ID) and a password from the user via the operation module 23, and then transmits a user authentication request including the received user ID and password to the server 3 via the device communication module 21. When the server 3 performs the authentication process successfully, the game executing module 262 displays, on the display module 24, a game screen retrieved from the server 3 via the device communication module 21, and also receives operations by the user via the operation module 23 to thereafter carry out processes for the game.

The deck creating module 263 outputs, to the display module 24, an owned-card screen for displaying the owned cards owned by the user, in response to an instruction by the user via the operation module 23. To enable this, the deck creating module 263 transmits a retrieving request for owned-card display data for requesting to retrieve display data related to the owned-card screen, to the server 3 via the device communication module 21. The retrieving request for owned-card display data includes the user ID of the user. The deck creating module 263 retrieves corresponding display data from the server 3 via the device communication module 21, creates drawing data on the basis of the retrieved display data, and then outputs the created drawing data to the display module 24.

The display data transmitted by the server 3 includes, as content data, the identification number of each owned card owned by the user (hereinafter referred to as a card ID), characteristics information indicating characteristics of each card such as attack power and defense power, image data, and the like, all of which are stored in the server 3. The display data also includes, as control data, information for displaying information on each card.

Upon receipt of designation of cards to be placed at the respective positions in the deck from the user via the operation module 23, the deck creating module 263 creates the deck, and then transmits deck formation information indicating the formation of the created deck, to the server 3 via the device communication module 21. The deck formation information includes each position in the deck and the card ID of the card placed at the position, in association with each other. Here, creating the deck includes placing a card at each position not provided with any card yet in the deck, and switching cards by placing a different card at a position already provided with a card.

The deck changing module 264 outputs, to the display module 24, a deck formation screen for making a change to the created deck, in response to an instruction by the user via the operation module 23. To enable this, the deck changing module 264 transmits a retrieving request for deck display-data for requesting to retrieve display data related to the deck formation screen, to the server 3 via the device communication module 21. The retrieving request for deck display-data includes the user ID of the user. The deck changing module 264 retrieves corresponding display data from the server 3 via the device communication module 21, creates drawing data on the basis of the retrieved display data, and then outputs the created drawing data to the display module 24.

The display data transmitted by the server 3 indicates, for each position in the deck of the user, the card ID, characteristics information, image data, and the like of the card placed at the position, as content data. The display data includes information for displaying the content data, as control data.

The deck changing module 264 is an example of a game-content-group changing module, and changes the deck according to an operation by the user via the operation module 23. In the following, description will be given of changing the arrangement of the cards constituting the deck, as an example of "making a change to the deck". The deck changing module 264 creates deck formation information of the deck at the time of starting a deck changing process, and changes, every time the cards constituting the deck are changed, the deck formation information of the deck accordingly. Then, upon completion of the deck changing process, the deck changing module 264 transmits the deck formation information of the changed deck in association with the user ID of the user, to the sever 3 via the device communication module 21.

When two cards among the cards constituting the deck are tapped on the operation module 23, the deck changing module 264 switches the positions of the two tapped cards. Moreover, when one card among the cards constituting the deck is slid to the position of a different card on the operation module 23, the deck changing module 264 switches the positions of the one card and the different card.

First, in response to a tapping operation by the user via the operation module 23, the deck changing module 264 retrieves, from the operation module 23, information of starting-point position indicating the starting point (touch1) corresponding to the position where a touch on the touch panel is started to be sensed. Moreover, the deck changing module 264 retrieves the time point of retrieving the information of starting-point position from the operation module 23, as information of starting-point time indicating the time (time1) when the touch started to be sensed. The deck changing module 264 determines which card has the starting point (touch1) located in a display area, from among the cards in the deck, and specifies the card having the starting point located in the display area, as a switching-target card. Thereafter, the deck changing module 264 retrieves, from the operation module 23, information of current-position indicating the current position (touch2) corresponding to the currently sensed position of the touch according to sliding operation by the user. Moreover, the deck changing module 264 retrieves, from the operation module 23, the time of retrieving the information of current-position as information of current-time indicating the current time point (time2).

The position indicated by each of the information of starting-point position and the information of current-position is represented by the value of an x-coordinate indicating the horizontal position and the value of a y-coordinate indicating the vertical position with reference to the upper left of the screen of the display module 24 (i.e., (x,y,z)=(0, 0,0)), for example. The deck changing module 264 can retrieve the information of starting-point position, the information of starting-point time, the information of current-position, and the information of current-time via JavaScript (registered trademark) touchmove events, for example. Moreover, the deck changing module 264 can retrieve information on the display area of each card (such as the width, the height, the margin between the display region of the card and the display region of a card adjacent horizontally (margin1), and the margin between the display region of the card and the display region of a card adjacent vertically (margin2)), using the getComputedStyle method.

Then, the deck changing module 264 calculates a movement distance from the starting point to the current position (distance1) on the basis of the position indicated by the information of current-position and the position indicated by the information of starting-point position. Moreover, the deck changing module 264 calculates a touch time where the portable device 2 is sensing the touch (time3=time2−time1), by subtracting the time point indicated by the information of starting-point time from the time point indicated by the information of current-time. When the movement distance (distance1) is longer than or equal to a predetermined distance (e.g., 40 pixels), or when the touch time (time3) is longer than or equal to a predetermined time period (e.g., 400 msec), the deck changing module 264 determines that the user has performed a sliding operation on the card. By contrast, when the sensing of the touch by the user is stopped before the movement distance (distance1) reaches the predetermined distance or before the touch time (time3) reaches the predetermined time period, the deck changing module 264 determines that the user has not performed the sliding operation.

When determining that a sliding operation has been performed, the deck changing module 264 moves the display position of the switching-target card according to the sliding operation. The deck changing module 264 can move the display position of the switching-target card using CSS3 webkitTransform=translated3 d(x,y,z).

Then, the deck changing module 264 retrieves, from the operation module 23, information of end-point position indicating the end point (touch3) corresponding to the position where the touch according to the sliding operation by the user is finished to be sensed. The deck changing module 264 determines which card has the end point (touch3) located in the display region, from among the cards in the deck, and specifies the card having the end point located in the display region, as a switching-destination card.

For example, when the difference value obtained by subtracting the x-coordinate of the starting point (touch1) from the x-coordinate of the end point (touch3) is larger than or equal to "(width+horizontal margin (margin1))×(1/2+n)" and smaller than "(width+horizontal margin)×(3/2+n)", a card positioned n cards rightward to the switching-target card in horizontal direction is identified as the switching-destination card. By contrast, when the difference value is larger than "(width+horizontal margin)×(-1/2-n)" and smaller than "(width+horizontal margin)×(1/2+n)", a card positioned at the same position as the switching-target card in horizontal direction is identified as the switching-destination card. Moreover, when the difference value is smaller than or equal to "(width+horizontal margin)×(-1/2-n)" and larger than "(width+horizontal margin)×(-3/2-n)", a card positioned n cards leftward to the switching-target card in horizontal direction is identified as the switching-destination card.

Similarly, when the difference value obtained by subtracting the y-coordinate of the starting point (touch1) from the y-coordinate of the end point (touch3) is larger than or equal to "(height+vertical margin (margin2))×(1/2+n)" and smaller than "(height+vertical margin)×(3/2+n)", a card positioned n cards downward to the switching-target card in vertical direction is identified as the switching-destination card. By contrast, when the difference value is larger than "(height+vertical marginx(-1/2-n)" and smaller than "(height+vertical margin)×(1/2+n)", a card positioned at the same position as the switching-target card in vertical direction is identified as the switching-destination card. Moreover, when the difference value is smaller than or equal to "(height+vertical margin)×(-1/2-n)" and larger than "(height+vertical margin)×(-3/2-n)", a card positioned n cards upward to the switching-target card in vertical direction is identified as the switching-destination card.

When the card positioned at the same position as the switching-target card both horizontally and vertically is identified as the switching-destination card, the deck changing module 264 does not switch positions of the cards.

By contrast, when determining that no sliding operation has been performed, the deck changing module 264 causes the switching-target card to be displayed differently from the other cards (e.g., displayed with a highlighted frame) so that the user can recognize that the switching-target card has been selected. Then, in response to a new tapping operation by the user via the operation module 23, the deck changing module 264 retrieves, from the operation module 23, information of second-starting-point position indicating a second starting point (touch4) where the touch panel has started to sense a touch again. The deck changing module 264 determines which card has the second starting point (touch4) located in the display area, from among the cards in the deck, and then specifies the card having the second starting point located in the display area, as the switching-destination card.

After specifying the switching-destination card, the deck changing module 264 switches the positions of the switching-target card and the switching-destination card. Specifically, the deck changing module 264 associates the position associated with the switching-target card with the card ID of the switching-destination card, while associating the position associated with the switching-destination card with the card ID of the switching-target card, in the deck formation information. The deck changing module 264 can switch the positions of two cards using the JavaScript (registered trademark) replaceChild method, for example.

The deck changing module 264 stores a corresponding change history in the history management table in the device storage module 22, every time a change is made to the deck. In response to an operation by the user via the operation module 23, the deck changing module 264 stores, at the top of the history management table, the state of the cards at the time of starting the process for making a change to the deck, as the initial state of the deck, and clears the other areas. When a change has been made to the deck, the deck changing module 264 stores in the device storage module 22, the state of the deck after the change, i.e., the deck formation information after the change, as change history. In other words, the deck changing module 264 stores, in the device storage module 22, the immediately previous state of the deck as a past state. Alternatively, the deck changing module 264 may store, as a change history, the contents corresponding to the change from the state of the deck immediately before the change (for example, that the switching-target card and the switching-destination card have been switched).

Figure 3A:
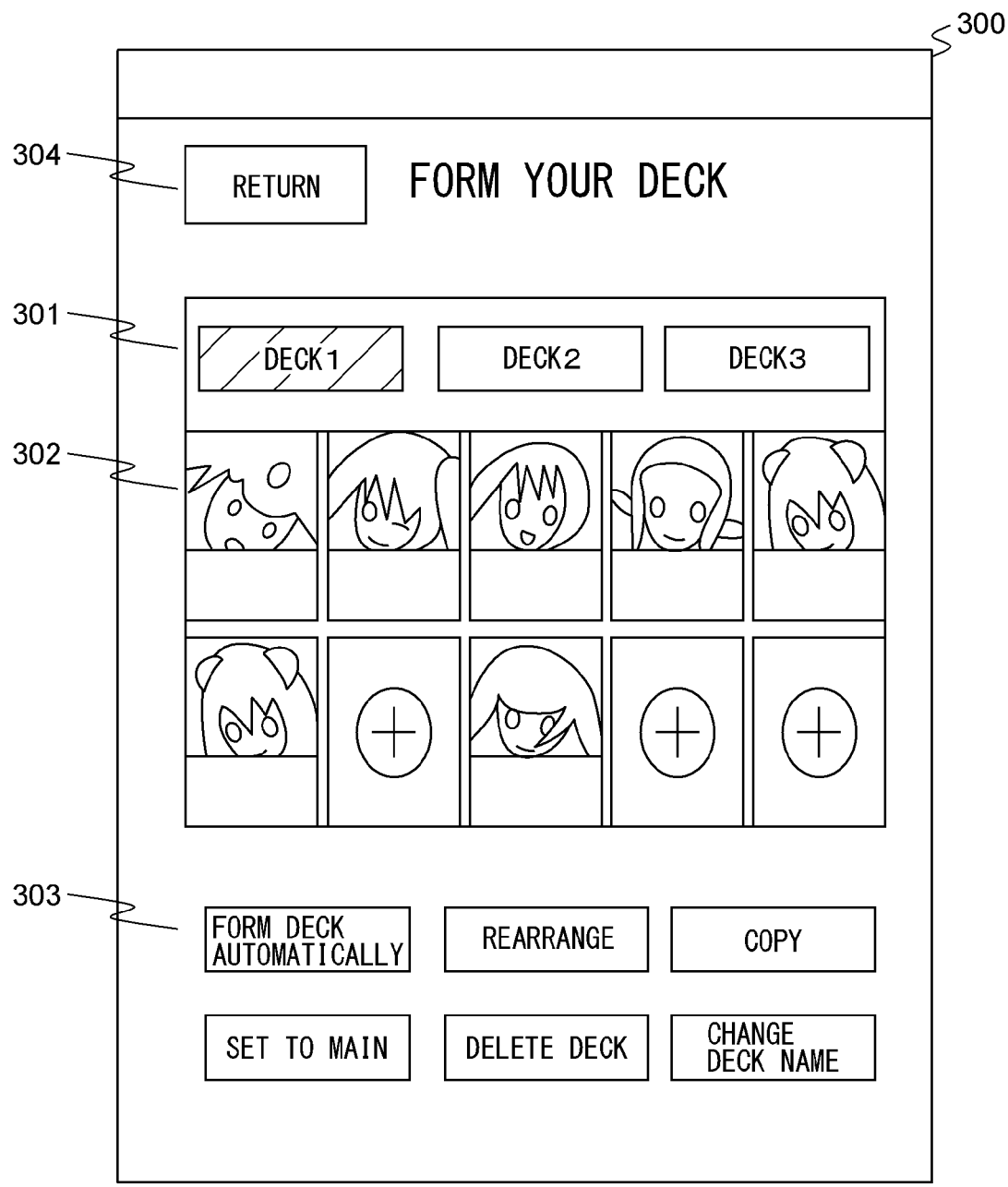
FIG. 3A is a view illustrating an example of a deck formation screen.

FIGS. 3A and 3B are views each illustrating an example of the deck formation screen displayed on the display module 24.

FIG. 3A illustrates an initial screen 300 of the deck formation screen. As illustrated in FIG. 3A, the initial screen 300 displays selection buttons 301 for selecting a deck from a plurality of decks, cards 302 constituting the selected deck, control buttons 303 each being for performing particular control on the selected deck, and a "return" button 304 for terminating the display of the deck formation screen. In the initial screen 300 illustrated in FIG. 3A, the selection button related to Deck 1 is selected from the selection buttons 301.

In the game illustrated in FIG. 3A, three decks can be set for each user. When one of the selection buttons 301 is tapped, the cards 302 constituting the deck corresponding to the tapped selection button 301 are displayed, which enables the user to make a change to the deck. The user can carry out a particular process, such as a battle in the game, using one of the three set decks.

Moreover, in the game illustrated in FIG. 3A, each deck forms a total of 10 cards, i.e., two rows vertically and five columns horizontally, and different characteristics are assigned to the respective positions. For example, the cards placed in the upper row are likely to be easily attacked by enemies while being capable of easily attacking enemies; by contrast, the cards placed in the lower row are not likely to be easily attacked by enemies while being incapable of easily attacking enemies. Similarly, the cards placed in the middle in the horizontal direction are likely to be easily attacked by enemies while being capable of easily attacking enemies; by contrast, the cards placed at both ends are not likely to be easily attacked by enemies while being incapable of easily attacking enemies.

The control buttons 303 include a "form deck automatically" button for causing the computer to automatically determine the formation of the deck, a "rearrange" button for rearranging the cards in the deck, and a "copy" button for making the formation of the deck same as the formation of a different deck. In addition, the control buttons 303 also include a "set to main" button for setting the deck to the default deck, a "delete deck" button for deleting the deck, and a "change deck name" button for changing the name of the deck.

FIG. 3B illustrates an editing screen 310 for editing a deck. When the "rearrange" button is tapped on the editing screen 300 illustrated in FIG. 3A, the editing screen 310 is displayed, which allows rearrangement of the cards in the deck. In the editing screen 310, the "rearrange" button is changed to a "done" button for confirming that the rearrangement of the cards is completed, and the other buttons except the "done" button are changed to indicate that the buttons are not active, and are thereby made impossible for the user to select. Upon tapping of the "rearrange" button, the deck changing module 264 creates deck formation information of the deck.

Figure 4A:
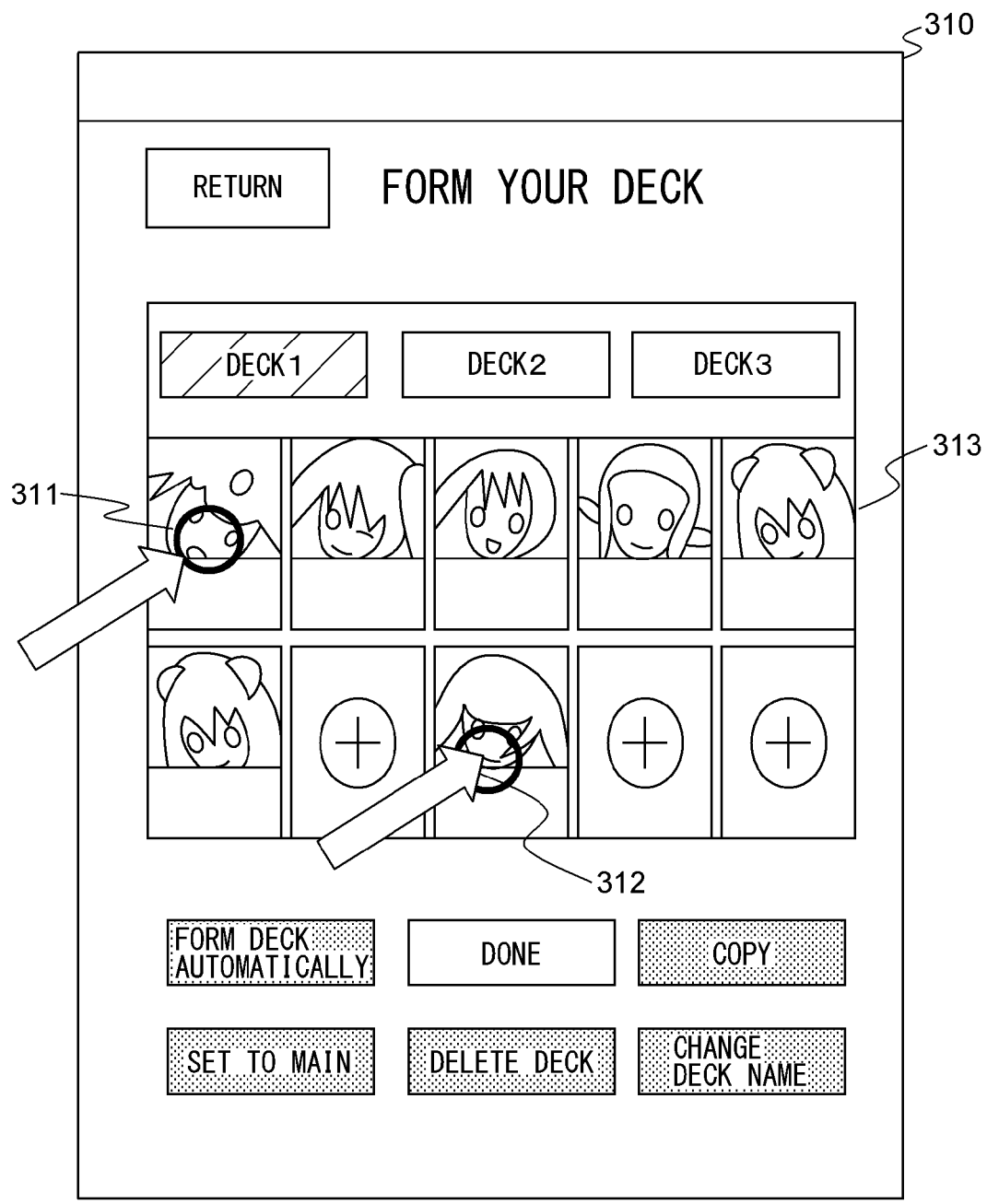
FIG. 4A is a view for illustrating how to make a change to the deck by tapping operations.
Figure 4B:
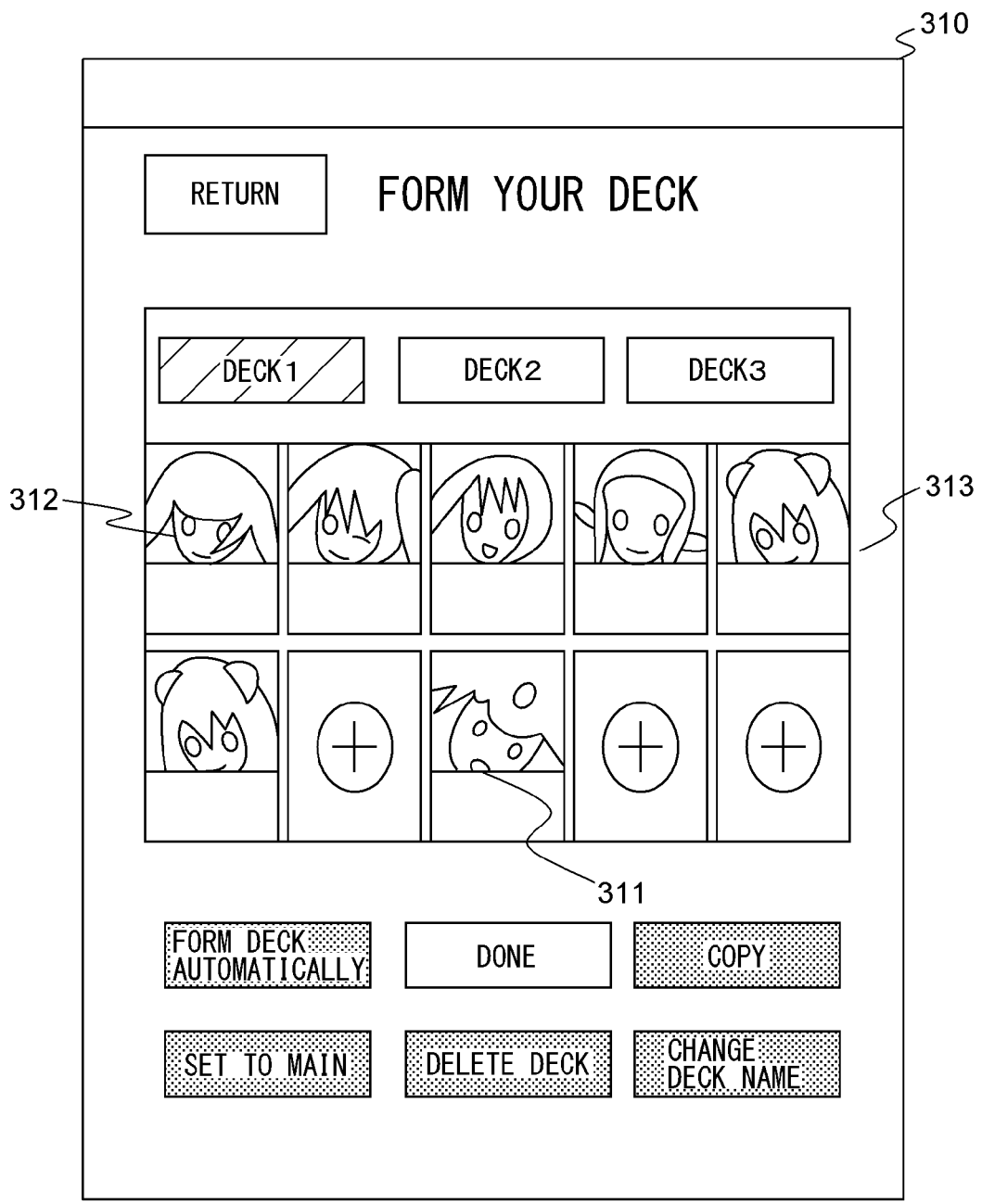
FIG. 4B is a view for illustrating how to make a change to the deck by tapping operations.

FIGS. 4A and 4B are views for illustrating how to make a change to a deck by tapping operations.

The editing screen 310 in FIG. 4A illustrates the initial state of the card arrangement. As illustrated in FIG. 4A, when a card 311 is tapped first and a card 312 is tapped subsequently on the editing screen 310, the positions of the card 311 and the card 312 are switched as illustrated in FIG. 4B. In this event, the deck changing module 264 updates the deck formation information, and stores the updated deck formation information in the device storage module 22, as a change history.

Figure 5A:
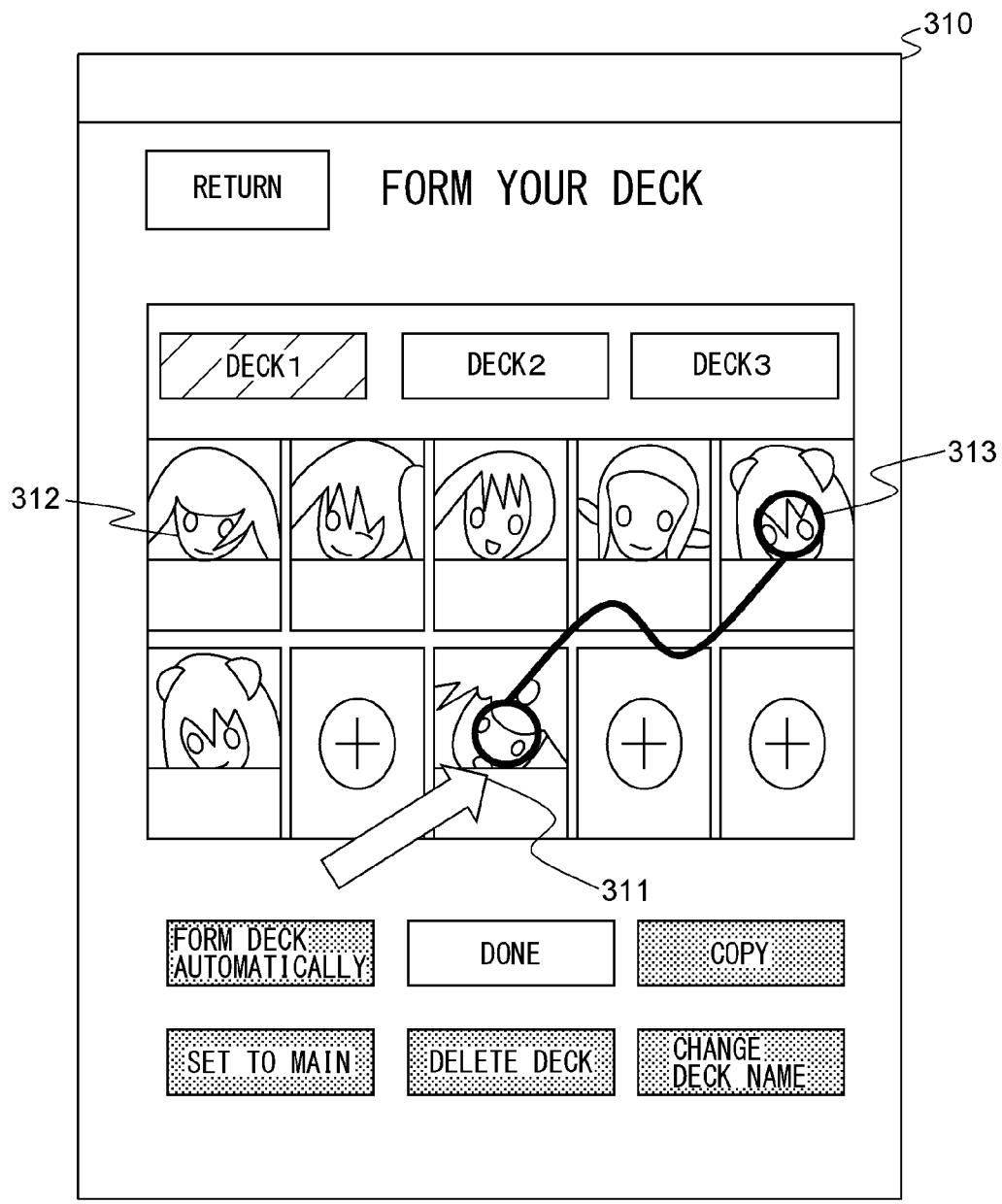
FIG. 5A is a view for illustrating how to make a change to the deck by a sliding operation.
Figure 5B:
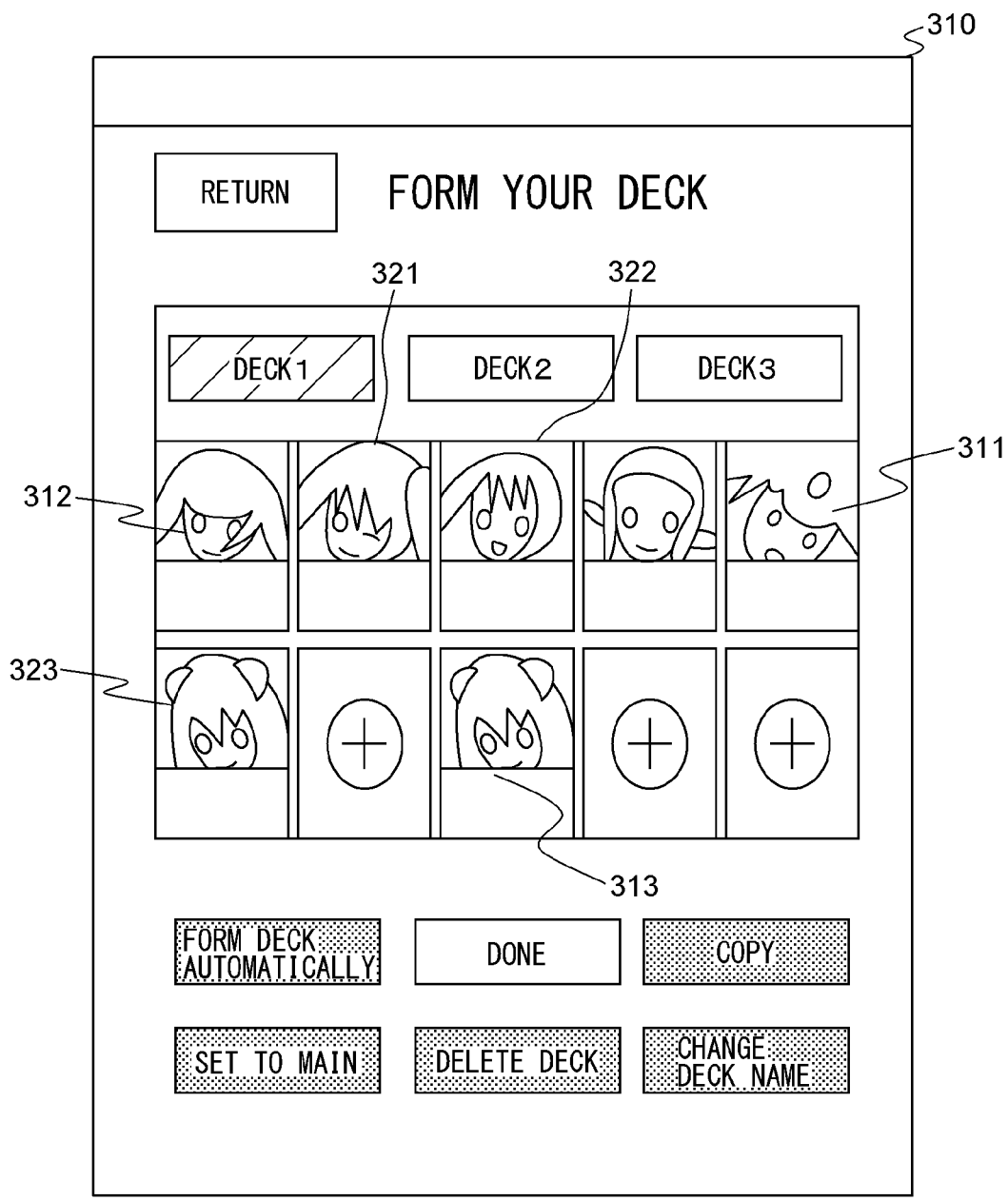
FIG. 5B is a view for illustrating how to make a change to the deck by a sliding operation.

FIGS. 5A and 5B are views for illustrating how to make a change to a deck by a sliding operation.

The editing screen 310 in FIG. 5A illustrates the editing screen after switching the positions of the cards by the tapping operations. When the card 311 is slid to the position of a card 313 on the editing screen 310 as illustrated in FIG. 5A, the positions of the card 311 and the card 313 are switched as illustrated in FIG. 5B. In this event, the deck changing module 264 updates the deck formation information, and stores the updated deck formation information in the device storage module 22, as a change history, as in the above case.

In the following, an example of determination on switching cards by the deck changing module 264 will be described with reference to FIG. 5B by taking, as an example, the case illustrated in FIG. 5B where "width+horizontal margin (margin1)" of each card is 60 pixels and "height+vertical margin (margin2)" of each card is 80 pixels. When the above-mentioned starting point (touch1) is located in the display area of the card 312 positioned in the leftmost position in the upper row, the horizontal movement distance to the end point (touch3) is longer than or equal to +30 pixels and is shorter than +90 pixels, and the vertical movement distance is shorter than +40 pixels, the deck changing module 264 switches the card 312 with a card 321 placed immediately right of the card 312. By contrast, when the horizontal movement distance is longer than or equal to +90 pixels and is shorter than +150 pixels, and the vertical movement distance is shorter than +40 pixels, the deck changing module 264 switches the card 312 with a card 322 placed right of the card 312 having another card placed therebetween. When the horizontal movement distance is longer than −30 pixels and is shorter than +30 pixels, and the vertical movement distance is longer than or equal to +40 pixels, the deck changing module 264 switches the card 312 with a card 323 placed immediately below the card 312.

When the positions of the cards are changed as illustrated in FIG. 4B or FIG. 5B and the "done" button is tapped, the deck changing module 264 transmits the latest deck formation information of the deck, to the server 3 via the device communication module 21.

The deck restoring module 265 is an example of a game-content-group restoring module, and restores the deck to the past state stored in the history management table in the device storage module 22, on the basis of a detection result of a shake on the portable device 2 by the shake detector 266.

When receiving notification from the shake detector 266 that a shake of the portable device 2 has been detected for once in a predetermined time period (e.g., 3 seconds), the deck restoring module 265 restores the deck to the state immediately previous to the current state, on the basis of the corresponding change history stored in the history management table. By contrast, when receiving notification from the shake detector 266 that a shake of the portable device 2 has been detected for a predetermined number of times (for example, more than once, e.g., three times) or more in the predetermined time period, the deck restoring module 265 restores the deck to the initial state. The initial state is the state at the time when the deck changing module 264 started the process of changing the cards constituting the deck, in response to the tapping of the "rearrange" button by the user via the operation module 23. Alternatively, the deck restoring module 265 may restore the cards constituting the deck to the initial state, also when receiving notification from the shake detector 266 that a shake of the portable device 2 has been detected for once. The deck restoring module 265 can delete the cards in the current deck using the JavaScript (registered trademark) removeChild method, and can arrange the cards as in the state immediately previous to the current state or as in the initial state using the appendChild method, for example.

When completing restoration of the cards constituting the deck to the state immediately previous to the current state, the deck restoring module 265 deletes the change history related to the current state from the history management table in the device storage module 22. Moreover, when completing restoration of the cards constituting the deck to the initial state, the deck restoring module 265 deletes the change history except for the one related to the initial state, from the history management table in the device storage module 22.

Figure 6A:
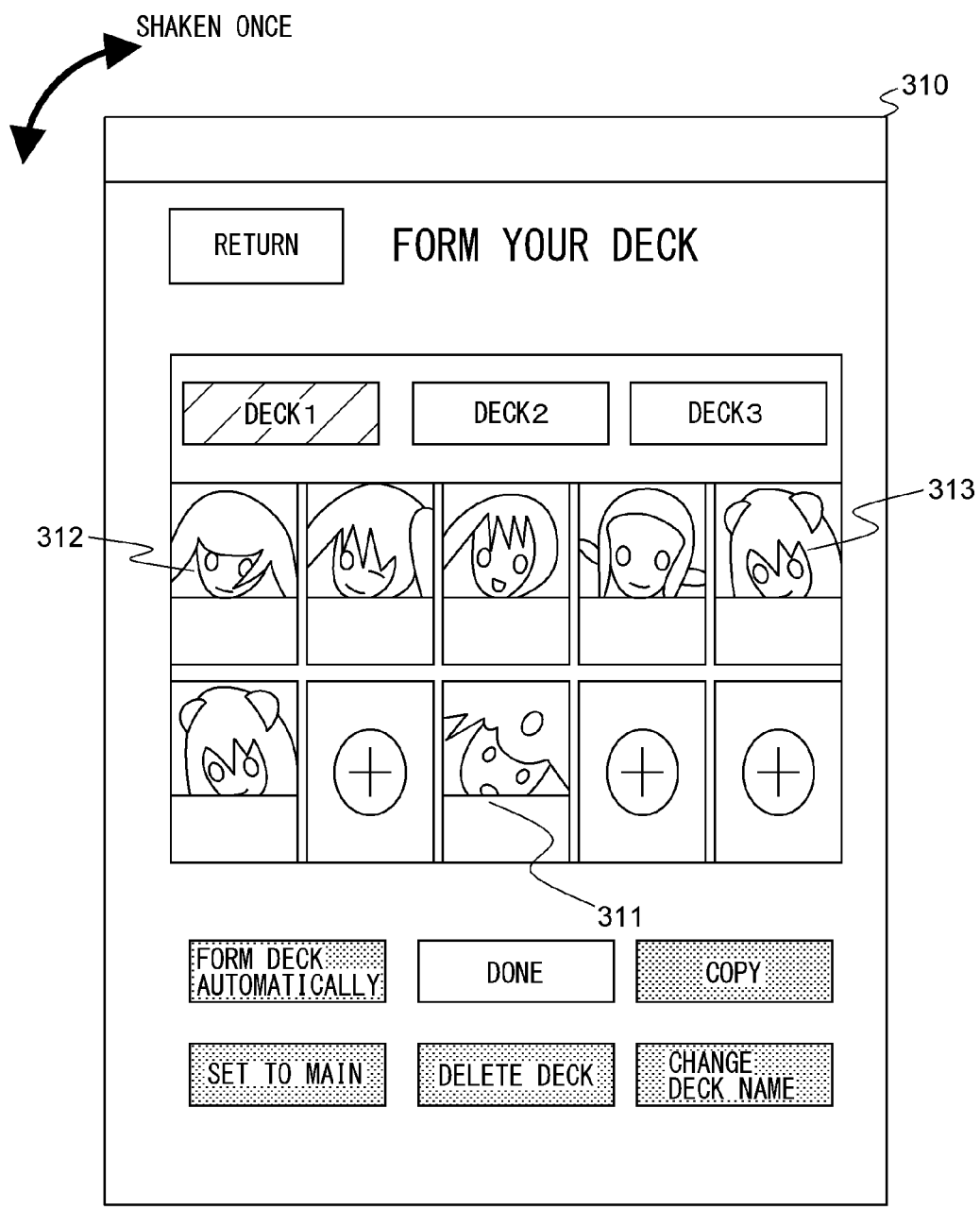
FIG. 6A is a view for illustrating restoration for the state of the deck.
Figure 6B:
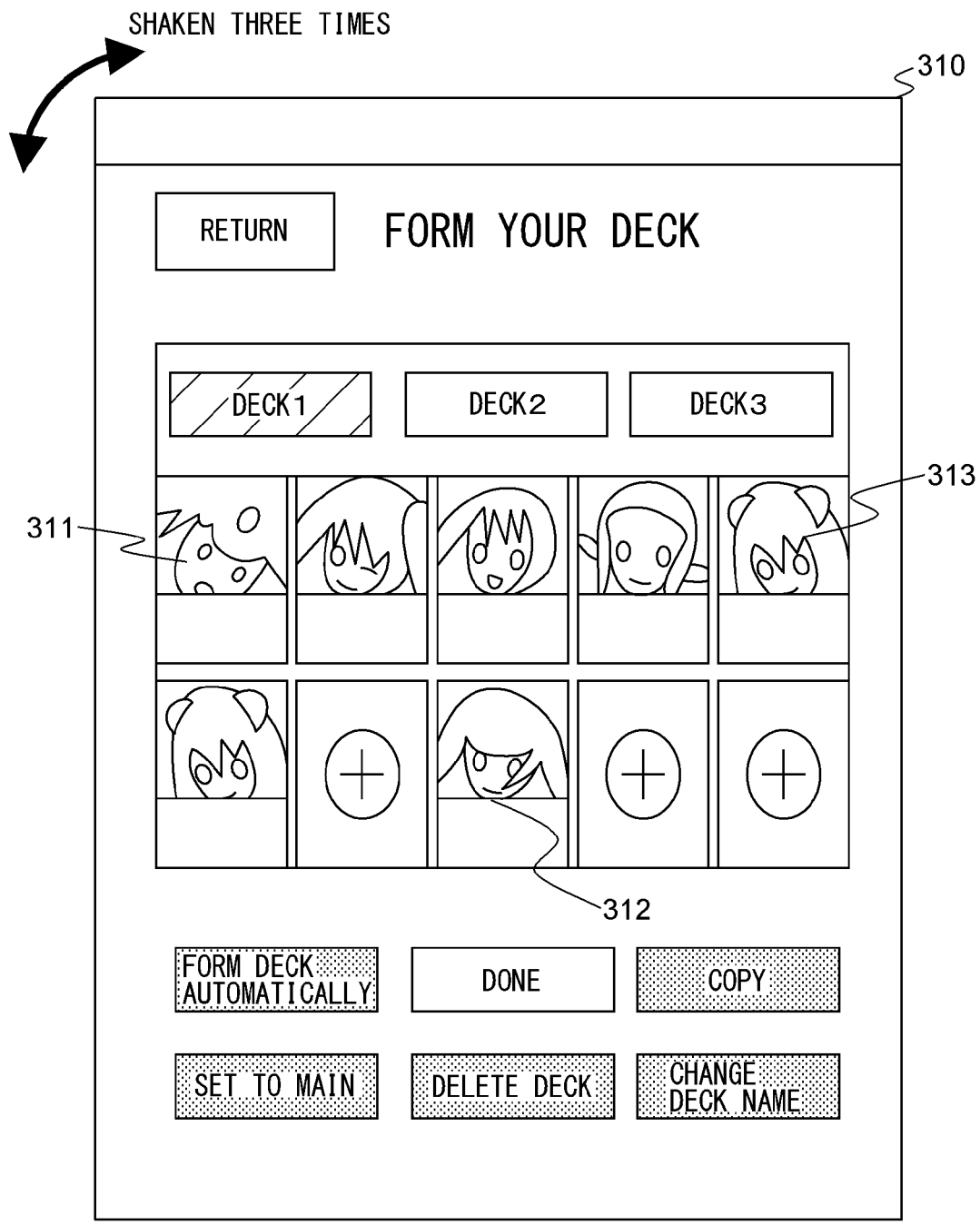
FIG. 6B is a view for illustrating restoration for the state of the deck.

FIGS. 6A and 6B are views for illustrating restoration of the state of a deck.

FIG. 6A illustrates the editing screen 310 in the case of receiving notification from the shake detector 266 that a shake of the portable device 2 has been detected for once, in the state illustrated in FIG. 5B. As illustrated in FIG. 6A, the cards constituting the deck are restored to the state illustrated in FIG. 5A, which is the state immediately previous to the state illustrated in FIG. 5B. FIG. 6B illustrates the editing screen 310 in the case of receiving notification from the shake detector 266 that a shake of the portable device 2 has been detected for the predetermined number of times or more in the predetermined time period, in the state illustrated in FIG. 5B. As illustrated in FIG. 6B, the cards constituting the deck are in the state illustrated in FIG. 3B (the state immediately after the "rearrange" button is tapped), which is the initial state.

The shake detector 266 detects a shake of the portable device 2, on the basis of acceleration information that is output by the acceleration sensor 25. When detecting a shake of the portable device 2, the shake detector 266 notifies the deck restoring module 265 that the portable device has been shaken. The shake detector 266 detects a shake of the portable device 2 when the X-direction acceleration indicated by the acceleration information becomes larger than or equal to a predetermined positive value for at least a predetermined number of times successively and then becomes smaller than a predetermined negative value for at least the predetermined number of times successively. Here, a "shake of the portable device 2" means that the portable device 2 is shaken by the user so that the portable device 2 would make a single to-and-fro motion horizontally with respect to the screen. For example, each predetermined value is set at the lowest acceleration value obtained by an experiment of shaking the portable device 2 to make only a single to-and-fro motion, and the predetermined number of times is set at the lowest number of times in which acceleration higher than or equal to the lowest value is successively detected.

Note that X-direction acceleration can be retrieved from the x property of the object e.accelerationIncludingGravity provided by the JavaScript (registered trademark) devicemotion event, for example.

(2.2) Configuration of Server 3

Figures 7A, 7B, 7C:
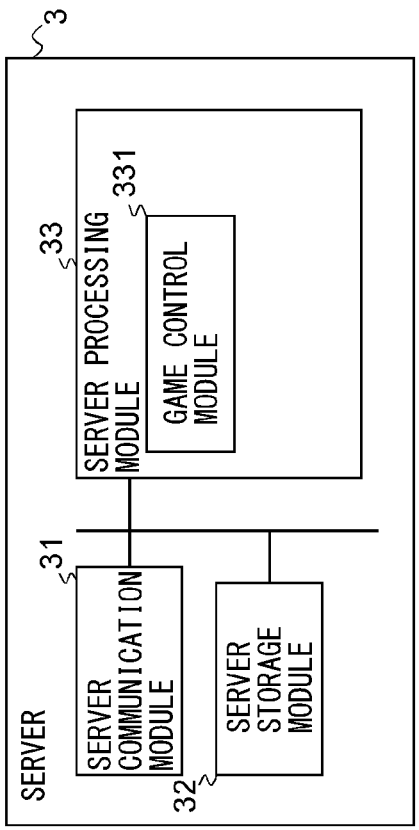
FIG. 7A is a diagram illustrating an example of a schematic configuration of a server 3.
FIG. 7B is a table illustrating an example of a data structure of various management tables.
FIG. 7C is a table illustrating an example of a data structure of various management tables.

FIG. 7A is a view illustrating an example of the schematic configuration of the server 3.

The server 3 provides a predetermined game to each portable device 2. Moreover, the server 3 stores information on each owned card owned by each user and to be used in the game, deck formation information of each deck to be used by each user, and the like. In response to a request from the portable device 2, the server 3 transmits corresponding information to the portable device 2, to cause the portable device 2 to display the information. To enable this, the server 3 includes a server communication module 31, a server storage module 32, and the server processing module 33.

The server communication module 31 includes a communication interface circuit for connecting the server 3 to the Internet 7, and thereby communicates with the Internet 7. Moreover, the server communication module 31 provides the server processing module 33 with data received from the portable device 2 or the like. Further, the server communication module 31 transmits data provided by the server processing module 33, to the portable device 2 or the like.

The server storage module 32 includes at least one of a magnetic tape device, a magnetic disk device, and an optical disk device, for example. The server storage module 32 stores such as an operating system program, driver programs, application programs, and data, to be used in processes by the server processing module 33. For example, the server storage module 32 stores, as application programs, a game program for creating display data related to an owned-card screen and display data related to a deck formation screen, and the like. In addition, the server storage module 32 stores, as data, a user management table (FIG. 7B) for managing users, a card management table (FIG. 7C) for managing information on each card to be used in the game, and the like. Additionally, the server storage module 32 may temporarily store temporary data related to predetermined processes. The computer program may be installed on the server module 32 from a computer-readable, non-transitory medium such as a compact disk read only memory (CD-ROM), a digital versatile disk read only memory (DVD-ROM), or the like by using a well-known setup program or the like.

FIGS. 7B and 7C are views each illustrating an example of the data structure of various management tables.

FIG. 7B illustrates a user management table for managing users. The user management table stores, for each user, the identification number (user ID), name, password of the user, the card ID of each owned card owned by the user, the deck formation information of each deck of the user, and the like.

FIG. 7C illustrates a card management table for managing information on each card to be used in the game. The card management table stores, for each card, the card ID, characteristics information indicating characteristics such as attack power and defense power, the file name of image data, and the like, of the card.

The server processing module 33 includes one or a plurality of processors and their peripheral circuitry. The server processing module 33 provides general control over operations of the entire server 3, and may be a CPU, for example. The server processing module 33 controls operations of the server communication module 31 and the like so that various processes by the server 3 would each be performed in an appropriate procedure according to the programs stored in the server storage module 32 and the like. The server processing module 33 performs each process on the basis of the programs stored in the server storage module 32 (i.e., the operating system program, driver programs, application programs, and the like). The server processing module 33 can execute multiple programs (application programs and the like) in parallel.

(2.2.1) Configuration of Server Processing Module 33

The server processing module 33 includes at least a game control module 331. The game control module 331 is a functional module implemented by a program executed on the processor contained in the server processing module 33. Alternatively, the game control module 331 may be implemented as firmware on the server 3.

The game control module 331 controls the progression of the game. When receiving a user authentication request from the portable device 2 via the server communication module 31, the game control module 331 specifies the user ID and the password by analyzing the received user authentication request. Then, the game control module 331 instructs a user authentication module (not illustrated) to carry out a process using the specified user ID and password as parameters.

When the authentication by the user authentication module is successful, the game control module 331 transmits a game screen for executing the game, to the portable device 2 via the server communication module 31, and thereafter carries out processes for the game.

The game control module 331 retrieves a retrieving request for owned-card display data from each portable device 2 via the server communication module 31. The game control module 331 reads out, from the user management table in the server storage module 32, the card IDs of the owned cards corresponding to the user ID included in the retrieving request for owned-card display data, and also reads out, from the card management table, the characteristics information and the image data corresponding to each card ID thus read out. The game control module 331 creates display data including the card ID, characteristics information, image data, and the like of each owned card, as content data, and information for displaying each piece of the information on each owned card, as control data, and then transmits the created display data to the corresponding portable device 2 via the server communication module 31.

Moreover, the game control module 331 retrieves a retrieving request for deck display-data from each portable device 2 via the server communication module 31. The game control module 331 reads out, from the user management table in the server storage module 32, the deck formation information corresponding to the user ID included in the retrieving request for deck display-data. The game control module 331 reads out, from the card management table, the characteristics information and the image data corresponding to each card ID included in the deck formation information thus read out. The game control module 331 creates display data including each card ID included in the deck formation information, the characteristics information and the image data of each card, and the like, as content data, and information for displaying the content data, as control data, and then transmits the created display data to the corresponding portable device 2 via the server communication module 31. On the basis of the display data, the game control module 331 causes the portable device 2 to carry out the process of changing the cards constituting the deck according to a user operation while storing a change history accordingly, and restoring the cards constituting the deck to the initial state or the predetermined state in the change history on the basis of a detection result by the shake detector 266.

Furthermore, upon retrieving, from each portable device 2 via the server communication module 31, of the deck formation information of the deck changed by the portable device 2 and the corresponding user ID, the game control module 331 stores the retrieved deck formation information in association with the retrieved user ID, in the user management table in the server storage module 32.

(3) Operation of Game System 1

FIG. 8 illustrates an example of an operation sequence of the game system 1. Note that the operation sequence to be described below is executed mainly by the device processing module 26 and the server processing module 33 in cooperation with the other modules of each portable device 2 and the server 3, on the basis of the programs stored in the device storage module 22 and the server storage module 32 in advance. It is assumed that a deck has been created before the operation sequence illustrated in FIG. 8 is executed.

First, the user instructs the device processing module 26 to execute the browsing program via the operation module 23 of the portable device 2. The device processing module 26 starts processes on the basis of the browsing program. Specifically, upon receipt of an instruction to start the game from the user via the operation module 23, the game executing module 262 of the browsing executing module 261 implemented by executing the browsing program further receives the user ID and the password from the user via the operation module 23. Then, the game executing module 262 transmits a user authentication request including the user ID and the password, to the server 3 via the device communication module 21 (step S101).

Upon receipt of the user authentication request from the portable device 2 via the server communication module 31, the game control module 331 of the server 3 specifies the user ID and the password by analyzing the received user authentication request. Then, the game control module 331 instructs the user authentication module (not illustrated) to carry out an authentication process using the specified user ID and password as parameters (step S102).

When the authentication by the user authentication module is successful, the game control module 331 transmits a game screen for executing the game, to the portable device 2 via the server communication module 31 (step S103).

The game executing module 262 of the portable device 2 displays, on the display module 24, the game screen retrieved from the server 3 via the device communication module 21, and thereafter carries out processes for the game (step S104).

Next, upon receipt of an instruction to form a deck from the user via the operation module 23 (step S105), the deck changing module 264 transmits a retrieving request for deck display-data including the user ID of the user of the portable device 2, to the server 3 via the device communication module 21 (step S106).

Upon retrieving of the retrieving request for deck display-data from each portable device 2 via the server communication module 31, the game control module 331 of the server 3 reads out the card IDs of the owned cards corresponding to the user ID included in the retrieving request for deck display-data, from the user management table in the server storage module 32. The game control module 331 reads out, from the card management table, the characteristics information and image data corresponding to each card ID thus read out. Then, the game control module 331 creates display data including the card ID, characteristics information, image data, and the like of each owned card, as content data, and information for displaying each piece of information on each owned card, as control data (step S107). Thereafter, the game control module 331 transmits the created display data to the corresponding portable device 2 via the server communication module 31 (step S108).

Upon retrieving of the display data from the server 3 via the device communication module 21, the deck changing module 264 of the portable device 2 creates drawing data related to a deck formation screen, on the basis of the retrieved display data, and displays the created drawing data on the display module 24 (step S109).

Then, upon receipt of an instruction to rearrange the cards in the deck, from the user via the operation module 23 (step S110), the deck changing module 264 carries out the deck changing process for changing the deck (step S111).

Figure 9:
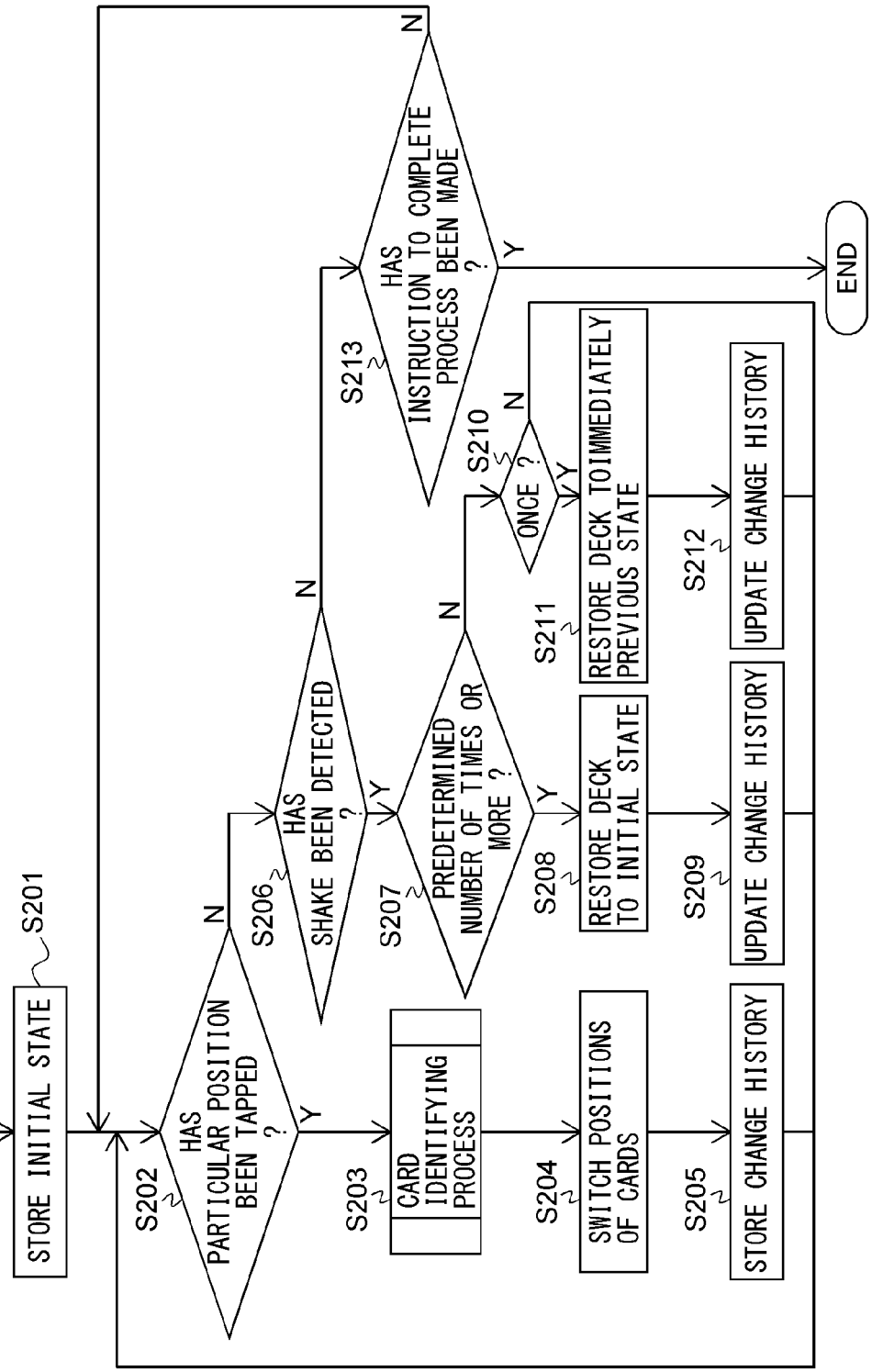
FIG. 9 is a flowchart illustrating an example of an operation flow of a deck arrangement changing process.

FIG. 9 is a flowchart illustrating an example of the operation flow of the deck changing process by the deck changing module 264.

First, the deck changing module 264 stores, at the top of the history management table, the state of the cards at the time of starting the deck changing process, as the initial state of the deck, and clears the other areas (step S201).

Then, the deck changing module 264 determines whether or not a particular position in the deck has been designated by a tapping operation by the user via the operation module 23 (step S202). When a particular position in the deck has been designated (Yes in step S202), the deck changing module 264 carries out a card identifying process for identifying the card designated by the user (step S203).

FIG. 10 is a flowchart illustrating an example of the operation flow of the card identifying process by the deck changing module 264.

First, in response to a tapping operation by the user via the operation module 23, the deck changing module 264 retrieves information of starting-point position and information of starting-point time (step S301), and then identifies a switching-target card (step S302). Then, the deck changing module 264 retrieves information of current-position and information of current-time (step S303), calculates the movement distance on the basis of the information of starting-point position and the information of current-position (step S304), and calculates the touch time on the basis of the information of starting-point time and the information of current-time (step S305).

Thereafter, the deck changing module 264 determines whether or not the movement distance is longer than or equal to a predetermined distance or the touch time is longer than or equal to a predetermined time period (step S306). When the movement distance is longer than or equal to the predetermined distance or the touch time is longer than or equal to the predetermined time period (Yes in step S306), the deck changing module 264 determines that the user has performed a sliding operation on the card (step S307). In this case, the deck changing module 264 retrieves information of end-point position (step S308), and identifies the card having the end point located in a display area, as the switching-destination card (step S309).

On the other hand, when the movement distance is shorter than the predetermined distance and the touch time is shorter than the predetermined time period (No in step S306), the deck changing module 264 determines whether or not the operation module 23 has finished sensing the touch by the user (step S310). When the operation module 23 has not finished sensing the touch by the user (No in step S310), the deck changing module 264 returns the process to step S306, and determines again whether or not the movement distance is longer than or equal to the predetermined distance or the touch time is longer than or equal to the predetermined time period. By contrast, when the operation module 23 has finished sensing the touch by the user (Yes in step S310), the deck changing module 264 determines that the user has not performed sliding operation on the card (step S311). In this case, the deck changing module 264 retrieves information of second-starting-point position (step S312), and identifies the card having the display area in which the second starting point, where the touch panel started to sense a touch again, is located, as the switching-destination card (step S313).

Return to FIG. 9. The deck changing module 264 switches the positions of the switching-target card and the switching-destination card (step S204), stores a change history in the history management table in the device storage module 22 (step S205), and then returns the process to the step S202.

On the other hand, when no particular position in the deck has been designated in step S202, the deck restoring module 265 determines whether or not notification of detecting a shake of the portable device 2 has been received from the shake detector 266 (step S206). When notification of detecting a shake of the portable device 2 has been received from the shake detector 266 (Yes in step S206), the deck restoring module 265 determines whether or not notification of detecting a shake of the portable device 2 has been received from the shake detector 266 for a predetermined number of times or more in a predetermined time period (step S207).

When notification of detecting a shake of the portable device 2 has been received from the shake detector 266 for the predetermined number of times or more in the predetermined time period (Yes in step S207), the deck restoring module 265 restores the deck to the initial state (step S208). Thereafter, the deck restoring module 265 deletes all the change history except the change history related to the initial state from the history management table in the device storage module 22 (step S209), and then returns the process to step S202.

On the other hand, when notification of detecting a shake of the portable device 2 has not been received from the shake detector 266 for the predetermined number of times or more in the predetermined time period (No in step S207), the deck restoring module 265 determines whether or not notification of detecting a shake of the portable device 2 has been received from the shake detector 266 for once in the predetermined time period (step S210). When notification of detecting a shake of the portable device 2 has been received from the shake detector 266 for once in the predetermined time period (Yes in step S210), the deck restoring module 265 restores the deck to the state immediately previous to the current state (step S211). Then, the deck restoring module 265 deletes the latest change history from the history management table of the device storage module 22 (step S212), and then returns the process to step S202.

By contrast, when the number of times that notification of detecting a shake of the portable device 2 has been received from the shake detector 266 is not once (No in step S210), the deck restoring module 265 determines that the user performed an erroneous operation, and returns the process to step S202 without carrying out any process.

When notification of detecting a shake of the portable device 2 has not been received from the shake detector 266 for the predetermined number of times or more in the predetermined time period in step S207, the deck restoring module 265 may restore the state of the deck to the previous state corresponding to the number of times that notification of detecting a shake of the portable device 2 has been received. In this case, the deck restoring module 265 deletes the latest change history corresponding to the number of times that notification of detecting a shake of the portable device 2 has been received, from the history management table of the device storage module 22.

By contrast, when notification of detecting a shake of the portable device 2 has not been received from the shake detector 266 (No in step S206), the deck changing module 264 determines whether or not the "done" button has been tapped by a tapping operation by the user via the operation module 23 (step S213). When the "done" button has not been tapped (No in step S213), the deck changing module 264 returns the process to step S201, while terminating the series of steps when the "done" button has been tapped (Yes in step S213).

Return to FIG. 8. The deck changing module 264 transmits the deck formation information of the changed deck in association with the user ID, to the server 3 via the device communication module 21 (step S112).

Upon retrieving of the deck formation information of the deck changed by the portable device 2 and the user ID, from the portable device 2 via the server communication module 31, the game control module 331 of the server 3 stores the retrieved deck formation information in association with the user ID, in the user management table in the server storage module 32 (step S113).

As has been described above, it is possible to improve the UX of each user executing a game in which a deck is used, at the time when the user operates the portable device, by changing the deck according to an operation by the user and restoring the deck to a past state when the portable device is shaken.

Note that the present invention is not limited to this embodiment. For example, in this embodiment, the example in which each portable device 2 carries out the deck changing process has been described. However, the server 3 may carry out the deck changing process, instead. In this case, the server storage module 32 of the server 3 stores the history management table, and the game control module 331 functions as the deck changing module and the deck restoring module. The deck changing module 264 of the portable device 2 notifies the server 3 of respective position information items and respective time information items related to sensing of a touch on the touch panel. The game control module 331 of the server 3 changes the deck according to the received position information and time information, and also updates the history management table. Moreover, the deck restoring module 265 of the portable device 2 notifies the server 3 that a shake of the portable device 2 has been detected. The game control module 331 of the server 3 restores the deck according to the received notification, and also updates the history management table accordingly. The game control module 331 of the server 3 creates display data of the deck in accordance with the new card arrangement, and transmits the created display data to the portable device 2. The portable device 2 updates the deck formation screen according to the received display data.

Moreover, in this embodiment, the example in which the deck creating module 263 creates a deck has been described. However, the deck changing module 264 may create a new deck. In this case, creating a deck can also be considered as an example of "making a change to a deck". The deck changing module 264 stores, at the top of the history management table, the state of a deck at the time of starting the process for creating the deck, i.e., the state of the deck in which no card is placed, as the initial state of the deck, and clears the other areas. Then, every time a new card is placed in the deck, or every time a card in the deck is switched, the deck changing module 264 stores, in the history management table, the state of the deck after the change as a change history. The deck restoring module 265 restores the deck to a past state stored in the history management table, on the basis of a detection result by the shake detector 266.

The deck changing module 264 may create a deck using a deck formation screen. In this case, when an arbitrary position is tapped with respect to a deck not created yet, on the initial screen of the deck formation screen illustrated in FIG. 3A, with an operation by the user via the operation module 23, the deck changing module 264 outputs an owned-card screen to the display module 24 as in the process by the deck creating module 263. Then, when any of the cards in the owned-card screen is tapped with an operation by the user via the operation module 23, the deck changing module 264 places the tapped card at the position tapped on the deck formation screen. Also when a position in which a card is already placed is tapped with an operation by the user via the operation module 23, the deck changing module 264 outputs an owned-card screen to the display module 24. Then, when any of the cards in the owned-card screen is tapped with an operation by the user via the operation module 23, the deck changing module 264 places the tapped card to a position tapped on the deck formation screen, to thereby switch the cards. The deck restoring module 265 restores the deck to a past state stored in the history management table, on the basis of a detection result by the shake detector 266.

Also in this case, the deck changing module 264 stores, at the top of the history management table, the state of the deck at the time of starting the process for creating the deck, as the initial state of the deck, and clears the other areas. Then, every time a new card is placed in the deck or every time a card in the deck is switched, the deck changing module 264 stores, in the history management table, the state of the deck after the change, as a change history.

Furthermore, the deck changing module 264 may change the cards themselves that constitute the deck, using a deck formation screen and an owned-card screen. In this case, changing the cards themselves that constitutes the deck is also considered as an example of "making a change to a deck". When a position not provided with any card yet or a position already provided with a card in the already-created deck has been tapped on the initial screen of the deck formation screen illustrated in FIG. 3A, with an operation by the user via the operation module 23, the deck changing module 264 outputs an owned-card screen to the display module 24. Then, when any of the cards in the owned-card screen has been tapped with an operation by the user via the operation module 23, the deck changing module 264 places the tapped card to the position tapped on the deck formation screen. When a card is already placed in the position tapped on the deck formation screen, the cards are switched.

The deck changing module 264 stores, at the top of the history management table, the state of the cards at the time of starting the process for changing the cards themselves that constitute the deck, i.e., the state of the cards when any card or a cell not provided with any card yet in the deck is tapped first, as the initial state of the deck, and clears the other areas. Then, when the deck is changed, the deck changing module 264 stores in the history management table, the state of the deck after the change as a change history. The deck restoring module 265 restores the deck to a past state stored in the history management table, on the basis of a detection result by the shake detector 266.

Moreover, the state to which the deck restoring module 265 restores the deck is not limited to a past state. For example, the portable device 2 may store, in the device storage module 22, a predetermined state of the deck determined by the portable device 2 or the server 3, and the deck restoring module 265 may restore the deck to the predetermined state of the deck stored in the device storage module 22, on the basis of a detection result by the shake detector 266.

Furthermore, the game contents used in the game executed by each portable device 2 are not limited to cards. The present invention is also applicable to games using game contents other than cards, such as character figures, avatars, or items, and using game-content groups each formed by multiple game contents. Also in this case, the portable device 2 stores a particular state (e.g., a past state) of the game-content group in the device storage module 22. The deck changing module 264 changes the game-content group according to an operation by the user via the operation module 23, and the deck restoring module 265 restores the game-content group to a particular state stored in the device storage module 22, on the basis of a detection result of a shake by the shake detector 266.

Furthermore, the server 3 may be omitted, and each portable device 2 may control the game, instead. In this case, the device storage module 22 stores information on the user of the portable device 2 from the user management table, the card management table, and the like. The device processing module 26 includes units having the same functions as those of the modules of the server processing module 33 of the server 3, in addition to the units illustrated in FIG. 2. The device processing module 26 transmits and receives information therein, instead of transmitting and receiving information via the device communication module 21 and the server communication module 31.

Furthermore, computer programs for causing a computer to implement the functions incorporated in the device processing module 26 and the server processing module 33 may be provided in the form stored on a computer-readable recording medium such as a magnetic recording medium, an optical recording medium, or the like.

It should be understood that those skilled in the art can make various changes, substitutions, and modifications to the embodiment without departing from the spirit and scope of the present invention.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A method for forming a game content group performed by a mobile computing device, the game content group formed by a plurality of game contents to be used in a game, the method comprising:
    storing a first state of the game content group in a storage module;
    changing the game content group to a second state according to detection of an operation performed by a user in the game;
    sensing a shake of the mobile computing device, by a shake sensor;
    detecting a shake of the mobile computing device based on information output from the shake sensor, by a shake detector; and
    restoring the game content group to the first state when the shake detector detects the shake of the mobile computing device.

2. The method of forming a game content group according to claim 1, wherein
    an initial state of the game content group is stored as the first state in the storage module, and
    the game content group is restored to the initial state, when detecting a shake for a predetermined number of times or more in a predetermined time period.

3. The method of forming a game content group according to claim 1, wherein
    an immediately previous state of the game content group is stored as the first state in the storage module, and
    the game content group is restored to the immediately previous state, when detecting a shake for once in a predetermined time period.

4. The method of forming a game content group according to claim 3, wherein, when the game content group is changed, the state of the game content group after the change is stored in the storage module.

5. The method of forming a game content group according to claim 1, wherein
    the operation module is a touch screen, and
    when two game contents among the game contents constituting the game content group are tapped on the operation module, the positions of the two tapped game contents are switched.

6. The method of forming a game content group according to claim 1, wherein
    the operation module is a touch screen, and
    when one game content among the game contents constituting the game content group is slid, on the operation module, to a position of a different one of the game contents constituting the game content group, a position of the one game content and the position of the different one of the game contents are switched.

7. A computer-readable, non-transitory medium storing a computer program, wherein the computer program causes a computer which includes an operation module, and which forms a game content group formed by a plurality of game contents to be used in a game, to execute a process, the process comprising:
    storing a first state of the game content group in a storage module;
    changing the game content group to a second state according to detection of an operation performed by a user in the game;
    sensing a shake of the mobile computing device, by a shake sensor;
    detecting a shake of the mobile computing device based on information output from the shake sensor, and
    restoring the game content group to the first state when detecting the shake of the mobile computing device.

8. A computer for forming a game content group formed by a plurality of game contents to be used in a game, comprising:
    an operation module;
    a storage module for storing a first state of the game content group;
    a game-content-group changing module for changing the game content group to a second state according to detection of an operation by a user in the game via the operation module;
    a shake sensor for sensing a shake of the mobile computing device;
    a shake detection module for detecting a shake of the mobile computing device based on information output from the shake sensor; and
    a game-content-group restoring module for restoring the game content group to the first state when the shake detection module detects the shake of the mobile computing device.

* * * * *